Figure 6:
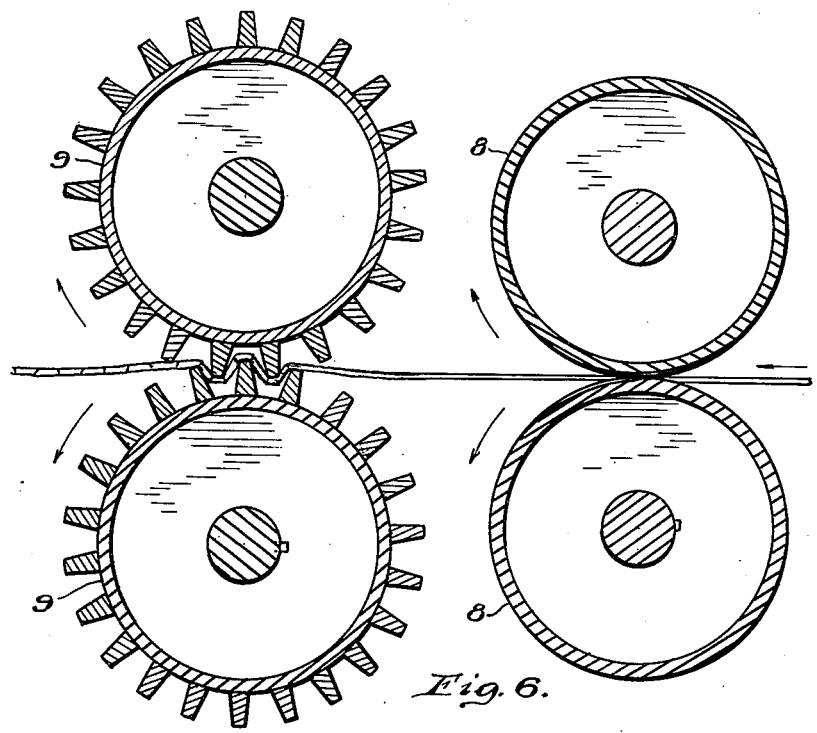

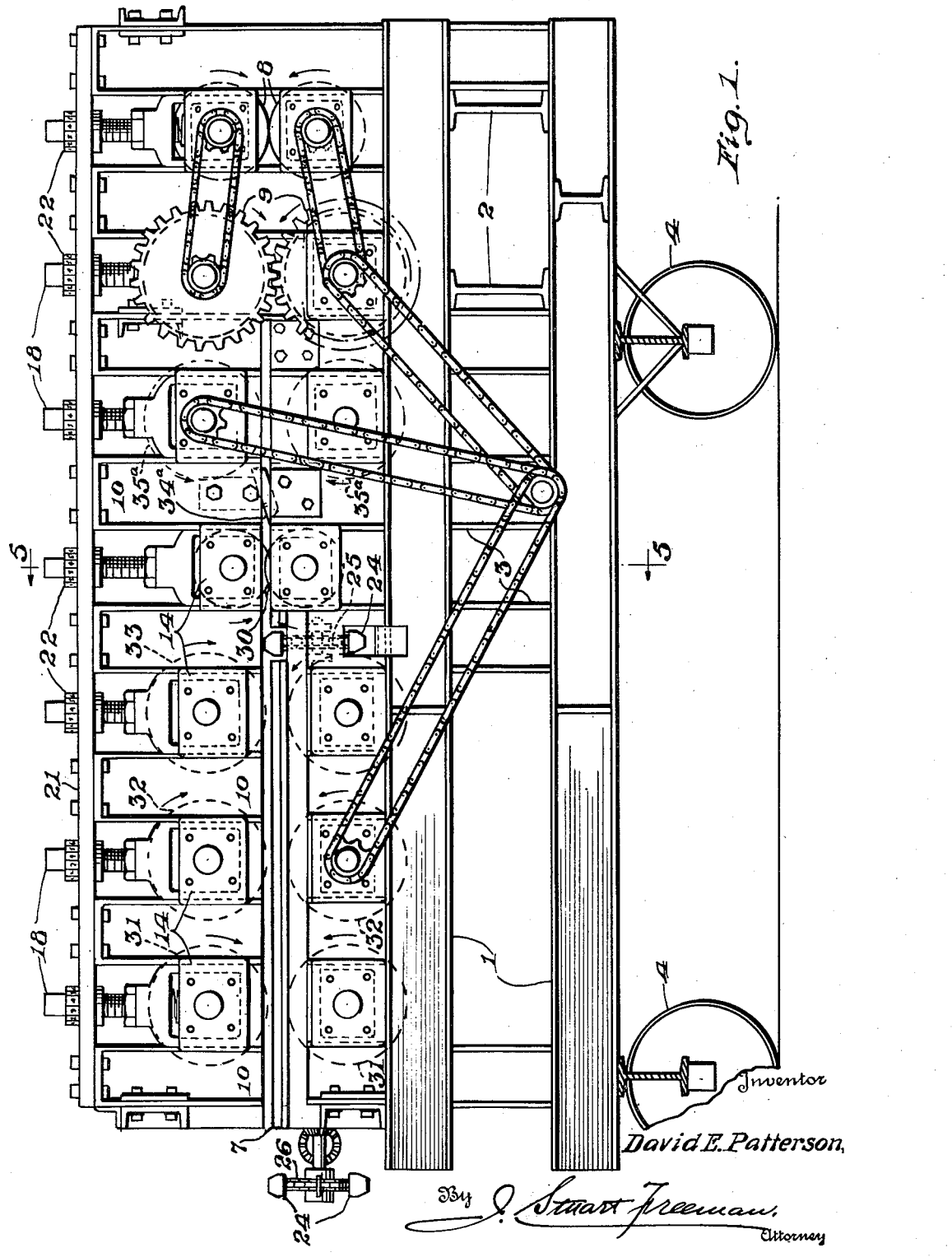

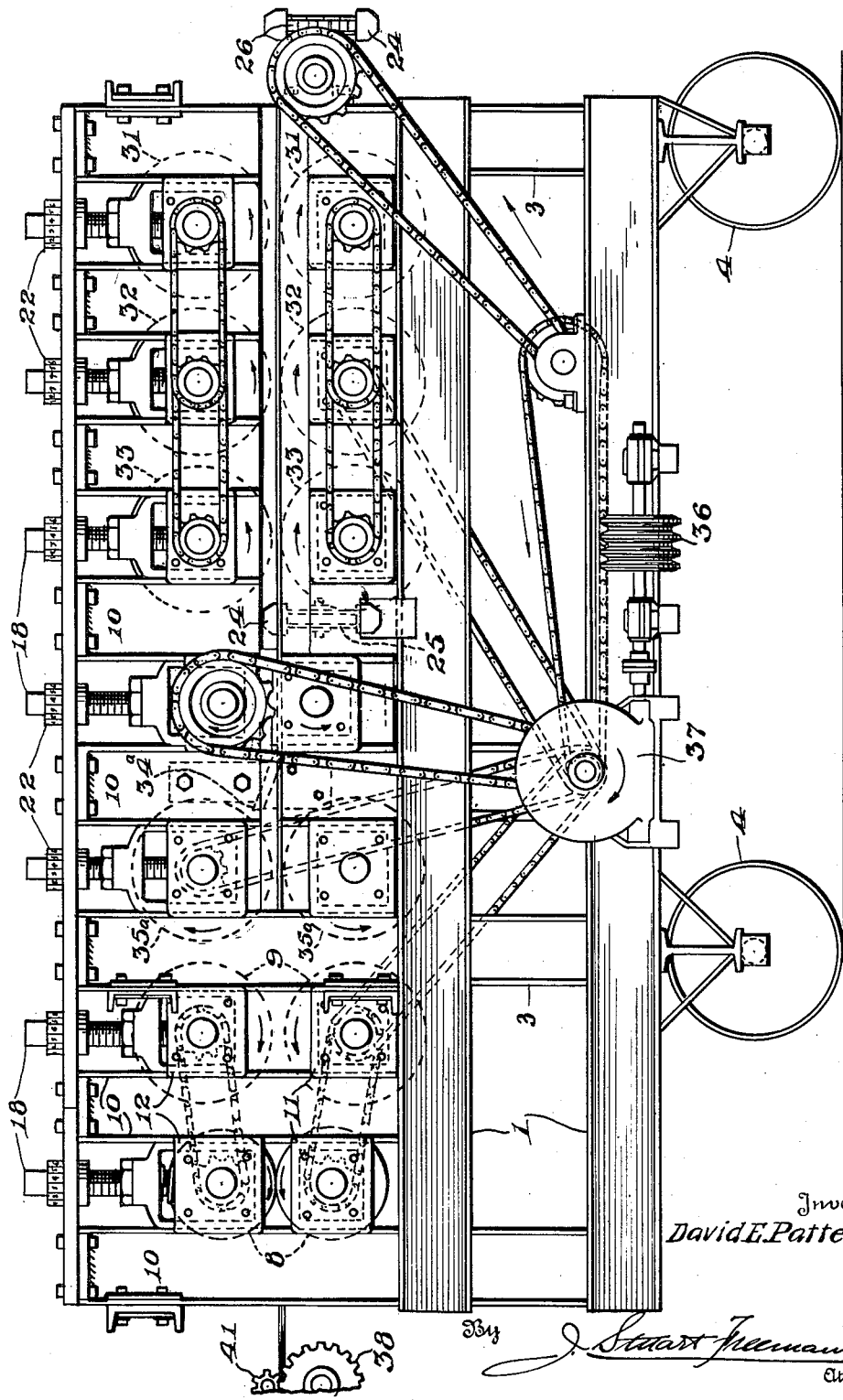

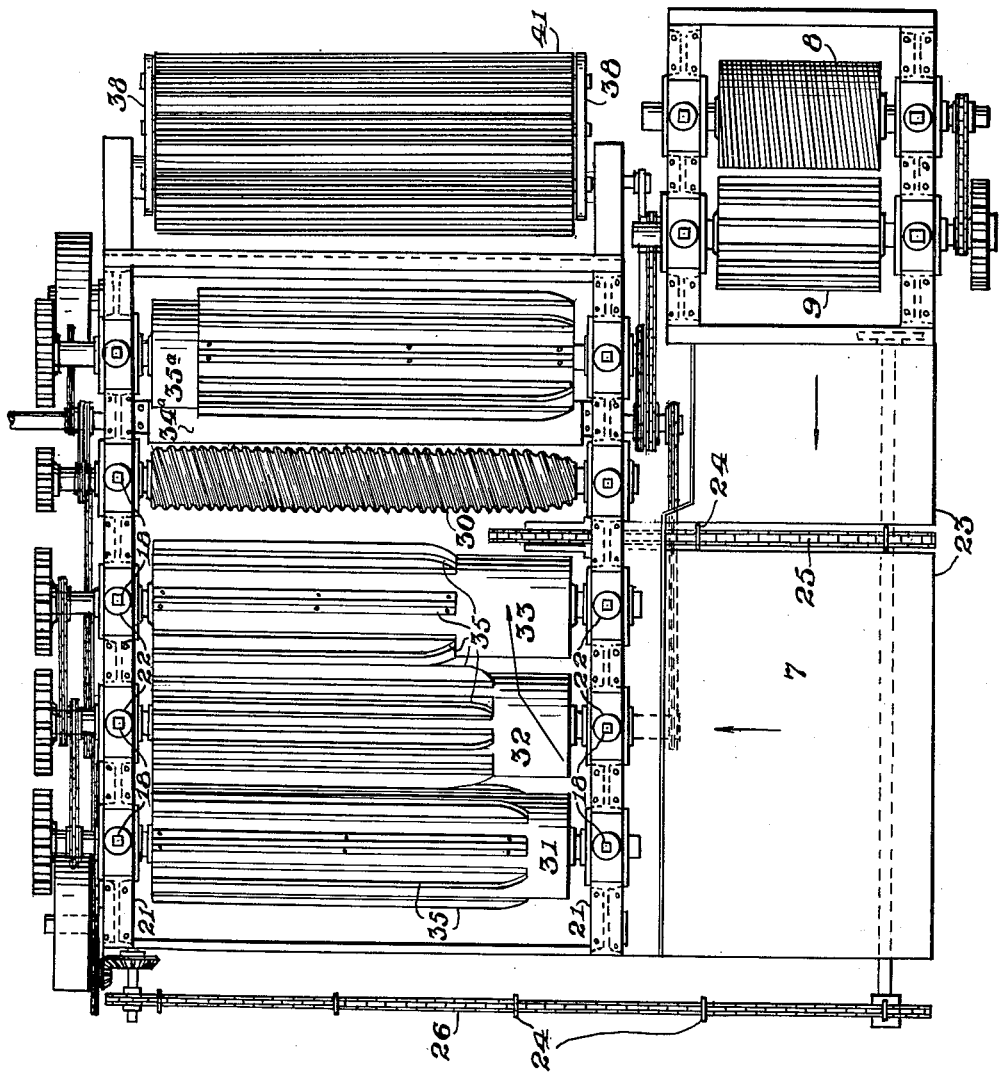

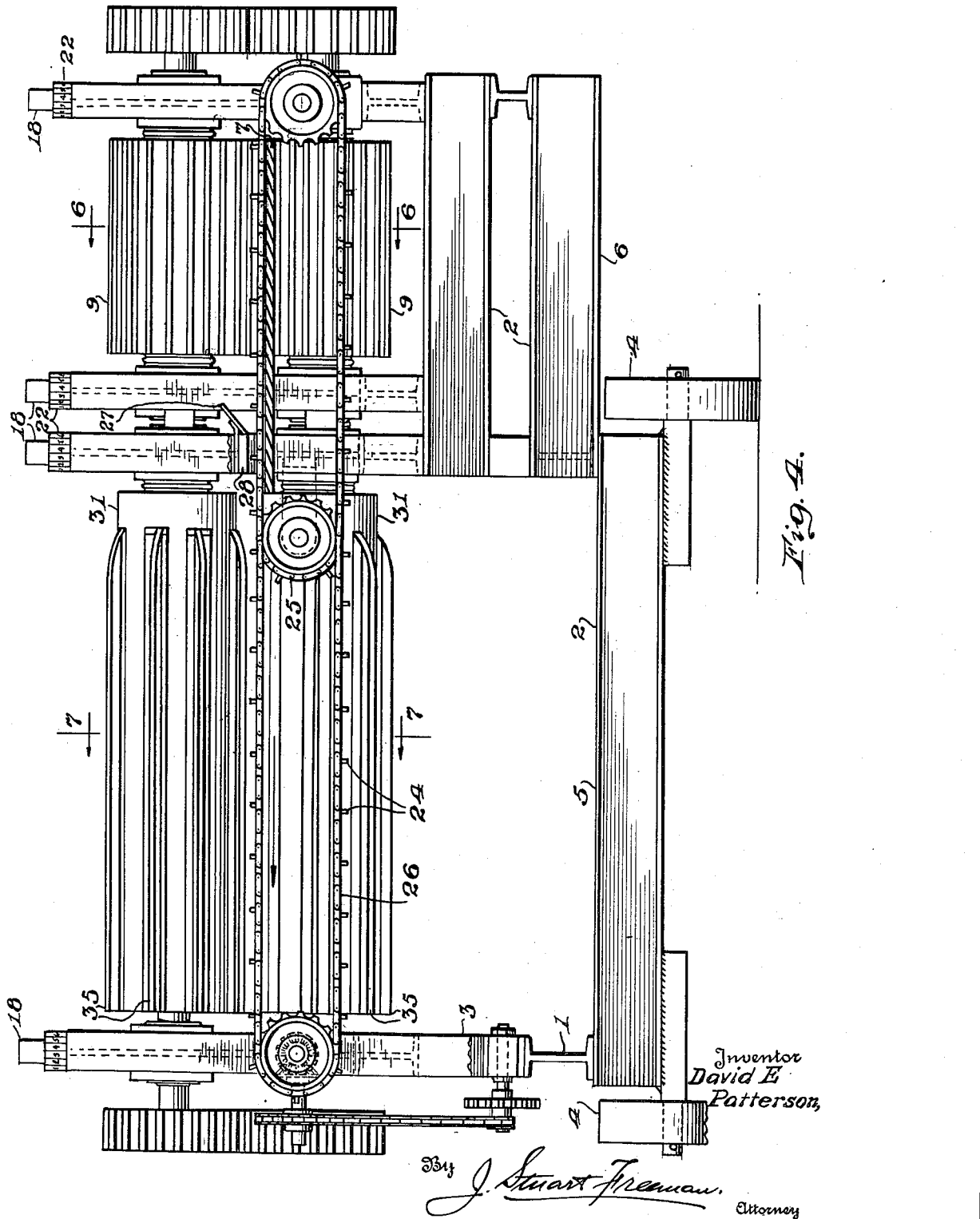

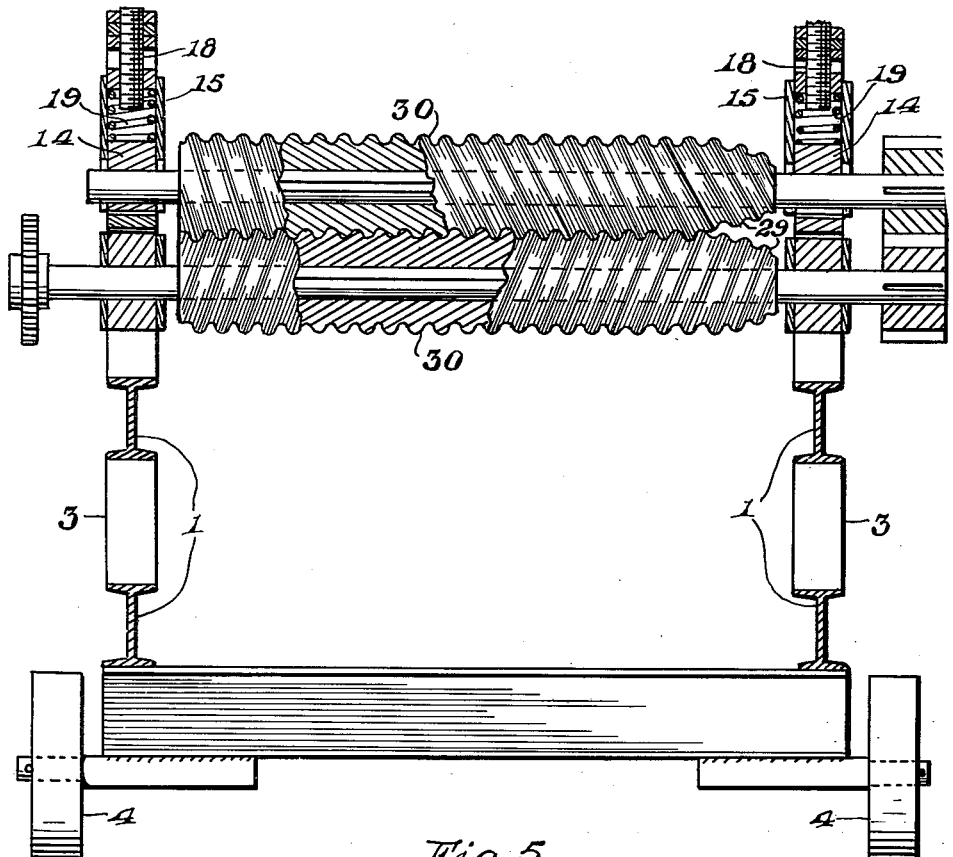
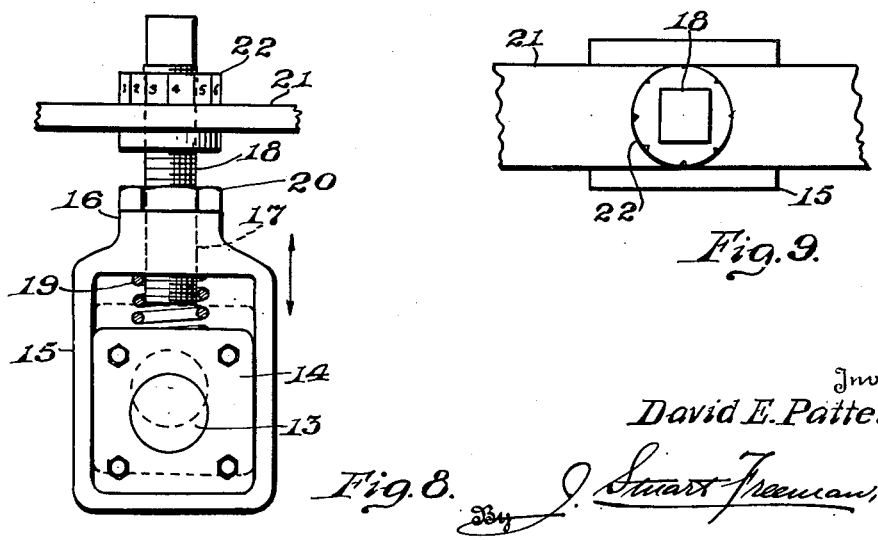

Aug. 30, 1949. D. E. PATTERSON 2,480,602
MACHINE FOR DECORTICATING FIBER-BEARING
STALKS AND LEAVES
Filed Aug. 26, 1944 7 Sheets-Sheet 6

Inventor
David E. Patterson
By
J. Stuart Freeman.
Attorney

Inventor
David E. Patterson,
By J. Stuart Freeman.
Attorney

Patented Aug. 30, 1949

2,480,602

UNITED STATES PATENT OFFICE 2,480,602

MACHINE FOR DECORTICATING FIBER-BEARING STALKS AND LEAVES

David E. Patterson, Philadelphia, Pa.

Application August 26, 1944, Serial No. 551,347

4 Claims. (Cl. 19—30)

The object of the invention is to provide improvements in both the method of and machines for decorticating bast (or stalk) and leaf fibers. The most important bast fibers are ramie, hemp, flax, roselle, malva, jute, seed-flax and seed-hemp, the last two being primarily raised for their seeds and their fibers being a byproduct. The most important leaf fibers are Manilla-hemp (century plant), sisal, sansivieria, henequin, pita, palm and palmetto. Heretofore, it has been practically if not wholly uniform practice to design separate machines and methods for decorticating leaf fibers from those decorticating bast fibers, whereas the improved method and machine hereinafter described decorticates both groups with equal efficiency for all practical purposes.

In order to design a universal machine, provision must be made for handling stalks and leaves that are either in dry or wet ("green") condition, and from the extremely small diameter stalks of fiber-flax, with its fibers of high tensile strength to the very large diameters of seed-hemp, which obviously require widely different methods of treatment, involving heretofore as widely different mechanical principles of handling.

The more slender stalks of fiber-flax, hemp, *Crolataria juncea* and ramie should have their inner wood preliminarily crushed and transversely broken at fairly definite intervals, to facilitate removal of the wood from the fiber. The relatively strong fibers of these plants will withstand the subsequent scutching, which is simply a series of pulling, scraping, bending and abrading operations.

By contrast, with the bast fibers of less tensile strength, such as roselle, malva, seed-hemp and the larger diameter stalks of ramie, in which the wood is hard and tough, it is impractical to break the inner wood by crushing and then breaking transversely, due to the greater angle or bending moment required to completely break the wood, the greater strain to which the fibers are subjected, and the inability of the outer fibers at each bend or break to stretch without being broken, and thereby rendering the resulting shortened lengths of fiber practically useless.

Consequently, bast fibers of low tensile strength can not be decorticated satisfactorily by breaking the inner wood transversely, but instead must be crushed and broken only longitudinally with the grain of the wood, and the outer layer of the stalk spread apart transversely, so as to thereby loosen the natural gums which tend to bind the fibers to the inner wood and to one another.

Another object, therefore, is to provide a machine which is adapted to both systems of decortication, and in which the following novel features are employed:

Spirally grooved feed rolls are provided, the cross section of the ridges and intervening grooves being curved and meshing as uniformly as possible, and the radii and pitch being so designed as to effect multitudinous longitudinal splintering of the woody part of the stalks, the uniform transverse spreading and opening of the stalk or leaf, and the loosening and separation of the individual fibers, all in the same operation, after which the outer bark is removed by abrasion. Similar action is effected with the inner pulpy matter and the outer skin of fiber-bearing leaves. These spiral feed rolls may be three instead of but two in height, so as to provide for the simultaneous feeding of separate layers of stalks and/or leaves in opposite directions, in which case the center roll does double duty, or for the reverse feed and increased transverse separation of the stalks or leaves of a single layer.

The stalks or leaves are initially fed transversely into the space between the spiral feed rolls and by said rolls are thereafter fed diagonally, thereby increasing the capacity of the machine over a straight or longitudinal feed, and distributing the wear upon the feed rolls and especially upon the working edge surfaces of the abrading beater elements.

The opposite end portions of the stalks or leaves, instead of being scutched or abraded in only one direction, are initially held centrally, with the least amount or degree of pressure, to a predetermined rate of forward speed, while they are scutched in opposite directions by fast-revolving abrading elements, and subsequently the rearwardly abrading portions are additionally abraded forwardly, before the fibers are discharged from the machine. Heretofore, it has been considered impossible to decorticate to the same degree all portions of a stalk or leaf throughout its entire extent, especially adjacent to one or both of its opposite ends, whereas the improved machine insures an equal degree of decortication at both ends and all intervening portions.

For some fibers there are provided in the spirally grooved feed rolls circumferentially spaced, longitudinally extending grooves, which are not in alignment or opposed to each other in the two rolls, and which aid in feeding leaves in particular and also receive some of the pulpy woody material, skin and similar waste products, and which waste may be cleaned from said rolls by jets or streams of water pouring over them.

Figure 7:
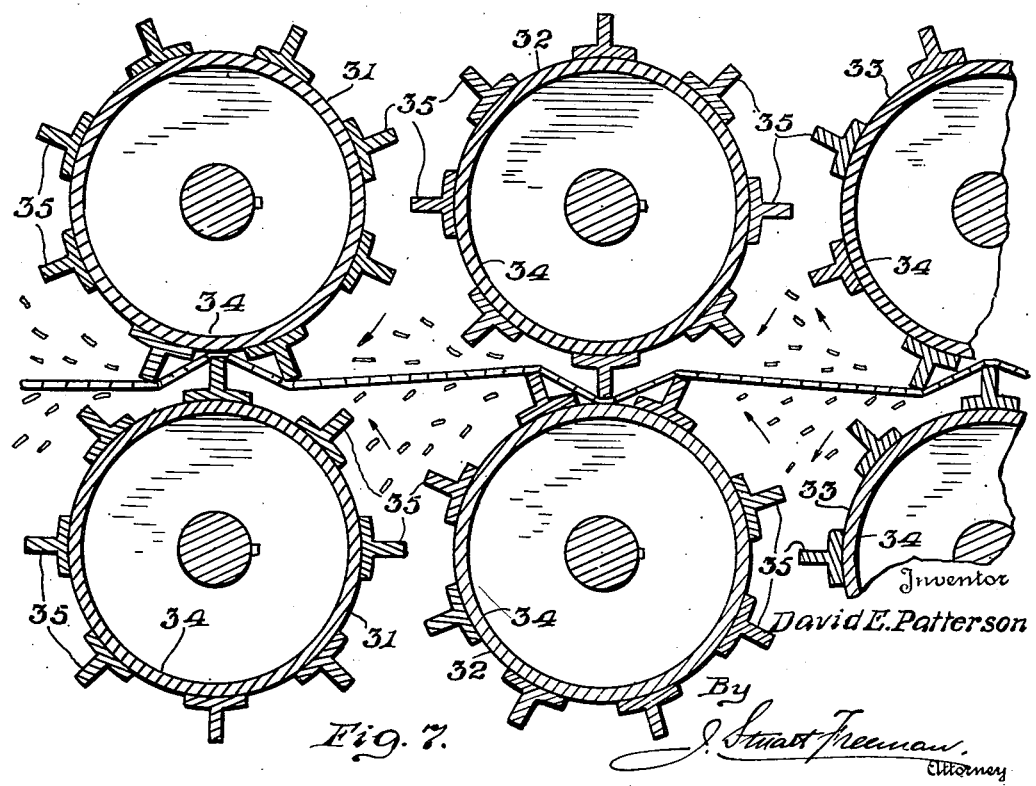
Figure 12:
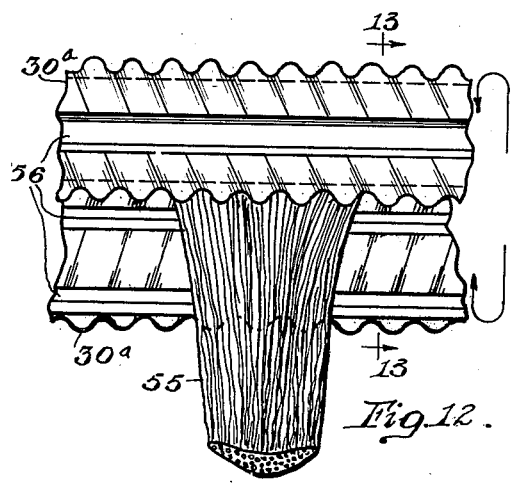
Figure 11:
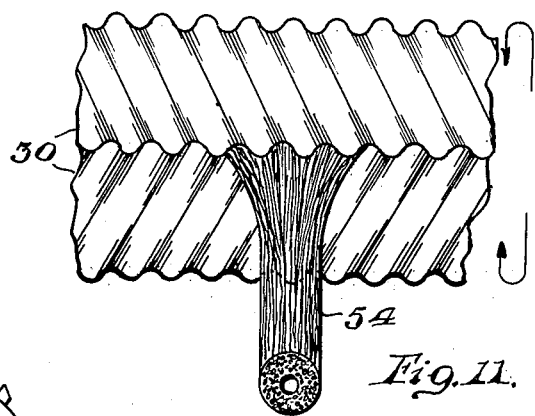
Figure 10:
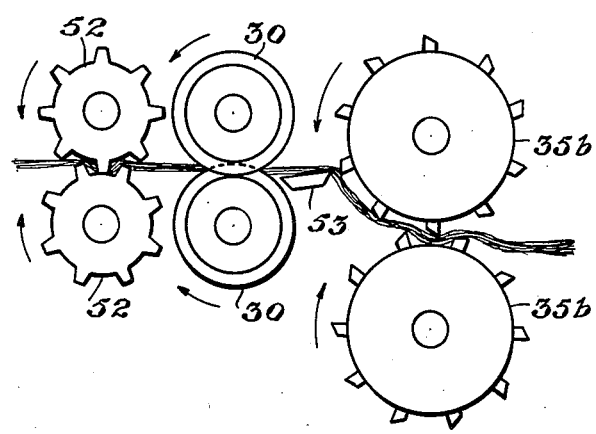
Figure 13:
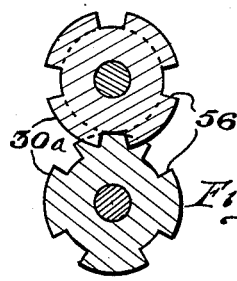

With these facts in mind, the invention comprises further details of construction and operation, which are hereinafter fully brought out in the following description, when read in conjunction with the accompanying drawings, in which Fig. 1 is a left side elevation of the machine comprising one embodiment of the invention, it being understood that the front or forward end of the machine is that end over which the decorticated fibers are discharged; Fig. 2 is a right side elevation of the same; Fig. 3 is a top plan view; Fig. 4 is a rear end elevation; Fig. 5 is a vertical section on the line 5—5 of Fig. 1 with portions of of the spirally grooved rolls shown in elevation; Fig. 6 is an enlarged vertical section on the line 6—6 of Fig. 4 shown in diagrammatic form; Fig. 7 is a similar section on the line 7—7 of Fig. 4; Fig. 8 is an enlarged fragmentary view showing the adjustment of certain of the rolls as hereinafter referred to; Fig. 9 is a top plan view of the same; Fig. 10 is a diagrammatic view showing a simplified modification of the machine; Fig. 11 is a fragmentary view showing central cooperating portions of the spirally grooved feed rolls with a stalk of bast fibers passing therethrough; Fig. 12 is a similar view of a modified form of said rolls and with a representative fiber-bearing leaf passing therethrough; and Fig. 13 is a section on the line 13—13 of Fig. 12.

Referring to the drawings, the improved decorticating machine, it will be understood, may be mounted upon any stable support, but for purposes of illustration is here shown as being mounted upon a system of unitarily secured I-beams extending longitudinally as at 1, transversely as at 2, and vertically as at 3. This frame may then in turn be supported by wheels 4 or other means, whereby the machine may be transported from place to place. As indicated by Fig. 4, the said frame may be considered as comprising two portions, namely, the main decorticating portion 5 and the laterally extending portion 6 which supports a table or platform 7, and when necessary also supports a pair of vertically aligned feed rolls 8 and to the rear thereof a pair of vertically aligned breaker elements 9 comprising longitudinally grooved rolls, the respective ridges of which enter the intervening grooves of each other. The surfaces of said feed rolls are preferably scored by shallow grooves, which may be spirally or otherwise arranged. These two pairs of feed and breaker rolls are rotatively supported by upwardly extending structural members 10, the lower roll of each of said pairs being rotatively mounted in a fixed bearing 11, while the upper of said feed rolls is rotatively mounted in a yielding bearing 12, which is both manually and automatically adjustable with respect to the lower feed roll, said adjustable bearing being illustrated in Figs. 8 and 9.

Referring for the moment to said Figs. 8 and 9, a roll-carrying shaft 13 is shown as being journaled in a bearing 14 which is vertically slidable between a pair of hollow guides 15. The uppermost portions of said guides are joined by a head 16 provided with a threaded bore 17 to receive a screw 18, the lower end of which positively limits the upward movement of bearing 14, which otherwise is normally maintained in a lower position (Fig. 8) by means of a coil spring 19, which surrounds the lower end of the screw 18 between said bearing and the head 16. Surrounding said screw above the head 16 is a lock nut 20, while the uppermost portion of said screw extends freely through a supporting element 21 of the frame and is adjustably positioned with respect thereto by means of a preferably calibrated nut 22. During operation of the machine, fiber-bearing stalks are first fed between the feed rolls 8 and then between the breaker elements 9, whence they pass longitudinally across and rest upon the table 7, where they are engaged at spaced intervals by spaced lugs 24 carried by two sprocket chains 25 and 26.

The first and most forwardly of these sprocket chains extends transversely of said table and somewhat into the space within the lateral limits of the decorticating section 5 of the machine, while the rearward of said chains extends substantially across the entire transverse extent of said decorticating section beyond the inner limit of said platform, as shown in Figs. 3 and 4.

As a stalk is propelled transversely across said platform, it is guided by a diagonally downwardly extending plate 27 beneath a bar 28, which in effect separates the two sections of the machine. Continuing, the forward end of the stalk or leaf enters the space between the adjacent narrowed end portions 29 of a pair of vertically aligned right- and left-hand spirally grooved feed rolls 30, which except for their narrow entrance end portions are the same diameter throughout and mesh at all times during their constant rotation, as indicated in Fig. 5. Upon the stalk or leaf having its forward end engaged by said spiral feed rolls, it begins to move diagonally forwardly, the rotation of said rolls causing the stalk or leaf to move substantially longitudinally, while the frictional interengagement between sides of the ridges and grooves of said rolls causes the said stalk or leaf to move transversely, with a resultant diagonal forward motion.

To the rear of said feed rolls are positioned a plurality of vertically positioned beater elements, in which form of the device herein illustrated (Figs. 1 and 3) these comprise three pairs of rotatable elements 31, 32, and 33, respectively. Each of the elements of these three pairs comprises a cylinder 34 from which radiate circumferentially spaced, longitudinally extending bars 35, which loosely intermesh as shown in Fig. 7, and it will be noted that at the right end of said cylinders said bars terminate in stepped relation and have their right end portions curved inwardly, so that they merge into the surfaces of the respective cylinders. Also, it will be noted that while the bars of all of said cylinders terminate coincident with the left-hand ends of said cylinders, the bars of the middle cylinders 32 are of less extent than and terminate short of the bars of the rearward cylinders 31. Similarly the bars of the forwardmost cylinders 33 are of less extent than and terminate short of the bars of the central cylinders 32.

With this construction it will at once become apparent that as a stalk or leaf is carried by the lugs of the rearward sprocket chain 26 between the rearmost cylinders 31, they are frictionally engaged and beaten or abraded by the bars of those cylinders, before an adjacent forward portion of said stalk or leaf is simultaneously engaged and abraded by the bars carried by the next forward pair of cylinders 32. Then, as the stalk or leaf progresses transversely forward between said cylinders and also slowly sidewise, it is in turn engaged and abraded by the bars of the forwardmost cylinders 33. During this diagonally forward movement of the stalk or leaf, it will be apparent that the abrasion effected by the bars carried by the cylinders 31, 32, and 33 is rearwardly or toward the rear end of such stalk or leaf.

Even before the rear portions of the representative stalk or leaf have entered the space between the second and third pairs of cylinders 32 and 33, its forward portion beyond the spiral feed rolls has similarly passed across the upper surface and the forward edge of a breaker bar 34a, from which the path taken by the stalk or leaf is abruptly deflected downwardly by and thence between a pair of forwardly positioned beater elements 35a, which are of the same general construction as those hereinbefore described, and which abrade the fibers in a forward direction at the same time that the rear portions of the stalk or leaf are being rearwardly abraded. In time, when the said stalk or leaf has passed forwardly beyond and free from engagement with the foremost of the rear abrading cylinders, it continues to be in engagement with and operated upon by the foremost element 35a until it is finally discharged therefrom.

It is understood that the rotation of the feed rolls and abrading elements may be effected in any suitable manner, but is illustrated in Figs. 1 and 2 as being driven by motive power from any suitable source (not shown) through the medium of a pulley 36 and suitable reduction gearing 37, so that the several elements are driven in the direction of rotation indicated by the respective arrows. Also, it is to be understood that instead of the three pairs of rearward beater elements 31, 32, and 33, there may be certain types of stalks and leaves which require only one or two such beating pairs, so that as many as may be necessary to effect the desired result may be provided. Again, it is to be emphasized that, while relatively heavy stalks are preferably first passed through the fiber and breaker rolls 8 and 9 and then deposited upon the platform 23, light weight stalks and most if not all of the fiber-bearing leaves may be directly placed upon said platform and thence fed transversely between the grooved feed rolls and the several rearward and forward beater elements as hereinbefore described. And, furthermore, it is to be understood that certain fibers such as roselle are sufficiently separated from one another, as well as being decorticated as a whole, when they emerge from the forward beater elements 35a. However, there are other stalk and leaf fibers especially when in a relatively "green" state that must be further acted upon to separate them from one another, even though substantially all of the bark, pith, woody material, present has been abraded and beaten or whipped therefrom.

Fig. 10 is a diagrammatic representation of the elements comprising an improved machine of utmost simplicity, comprising a single pair of breaker elements 52, from which the light-weight stalks pass between a pair of spirally grooved feed rolls 30, where they are crushed and thence fed over a breaker bar 53 and between a pair of abrading rolls 35b. Such a machine, being light in weight, is easily transported from place to place, and is suitable for certain types of bast fibers in particular.

Referring to Fig. 11, there is here shown the way in which the tightly fitting spiral feed rolls cooperate to spread apart the fibers of a stalk 54 of bast fiber. In a similar manner, referring to Fig. 12, the fiber-bearing leaf 55 is spread transversely by and between spirally grooved rolls 30a, but in this case said rolls are provided with circumferentially spaced, longitudinally extending grooves 56, which receive the relatively moist pulp and sap of green leaves, as the same is crushed from the fibers and to a certain extent scraped therefrom by the sides and edges of said grooves. The angular relation of these grooves is shown by Fig. 13.

Having thus described my invention, what I claim and desire to protect by Letters Patent of the United States is:

1. A machine for decorticating fiber-bearing stalks or leaves, comprising a pair of rotating, rearwardly abrading, beater elements, a pair of rotating, forwardly abrading, beater elements, and means to generally lengthwise feed the stalks or leaves simultaneously both transversely and longitudinally into engagement by said elements, so that the stalks or leaves first have their opposite ends abraded in opposite directions after which their entire length is subjected to said forwardly abrading elements.

2. A machine for decorticating fiber-bearing stalks or leaves, comprising a pair of meshing, spirally grooved, feeder rolls spaced apart at one end to receive stalks or leaves fed transversely between them, pairs of rotating, rearwardly abrading, beater elements of different lengths upon the rear side of said feeder rolls, and a pair or rotating, forwardly abrading, beater elements upon the forward side of said feeder rolls.

3. A machine for decorticating fiber-bearing stalks or leaves, comprising a pair of meshing, spirally grooved, feeder rolls spaced apart at one end to receive stalks or leaves fed transversely between them, pairs of rotating, rearwardly abrading, beater elements of different lengths upon the rear side of said feeder rolls, the lengths of said beater elements increasing progressively away from said feeder rolls, and a pair of rotating, forwardly abrading, beater elements upon the forward side of said feeder rolls.

4. A machine for decorticating fiber-bearing stalks, comprising a pair of loosely meshing grooved rolls operative to break the woody portion, pith and bark of the stalk transversely at spaced intervals, a table to receive the broken stalk from said breaking rolls, a pair of meshing, spirally grooved, feeder rolls spaced apart at one end to receive stalks moving transversely towards them, conveyor mechanism to propel broken stalks transversely upon said table to and between the ends of said feeder rolls, a pair of rotating, rearwardly abrading, beater elements upon the rear side of said feeder rolls, and a pair of rotating, forwardly abrading, beater elements upon the forward side of said feeder rolls.

DAVID E. PATTERSON.

REFERENCES CITED

The following references are of record in the file of this patent:

UNITED STATES PATENTS

| Number | Name | Date |
|---|---|---|
| 8,360 | Treat et al. | Sept. 16, 1851 |
| 36,485 | Sanford et al. | Sept. 16, 1862 |
| 425,006 | Scott | Apr. 8, 1890 |
| 428,325 | Ward | May 20, 1890 |
| 541,648 | Young | June 25, 1895 |
| 594,973 | Subra | Dec. 7, 1897 |
| 759,197 | Shely et al. | May 3, 1904 |
| 845,267 | Saxton | Feb. 26, 1907 |
| 899,846 | Scherr et al. | Sept. 29, 1908 |
| 1,219,691 | Beere et al. | Mar. 20, 1917 |
| 1,308,376 | Schlichten | July 1, 1919 |
| 1,315,328 | Pritchard | Sept. 9, 1919 |
| 2,125,800 | Milburn et al. | Aug. 2, 1938 |
| 2,264,236 | Bokum et al. | Nov. 25, 1941 |
| 2,282,715 | Faure | May 12, 1942 |

FOREIGN PATENTS

| Number | Country | Date |
|---|---|---|
| 256,396 | Italy | Dec. 23, 1927 |